United States Patent [19]
Flowerdew

[11] Patent Number: 6,061,030
[45] Date of Patent: May 9, 2000

[54] AERIAL ARRAYS FOR MAGNETIC INDUCTION COMMUNICATION SYSTEMS HAVING LIMITED POWER SUPPLIES

[75] Inventor: Peter M. Flowerdew, Bristol, United Kingdom

[73] Assignee: Plantronics, Inc., Santa Cruz, Calif.

[21] Appl. No.: 09/006,921

[22] Filed: Jan. 14, 1998

Related U.S. Application Data

[63] Continuation-in-part of application No. 08/742,337, Nov. 1, 1996, Pat. No. 5,966,641.

[51] Int. Cl.$^7$ ....................................................... H01Q 7/00
[52] U.S. Cl. ............................ 343/742; 343/741; 343/788; 343/856; 343/867
[58] Field of Search ..................................... 343/741, 742, 343/787, 788, 866, 867, 855, 856; H01Q 11/12, 7/00

[56] References Cited

U.S. PATENT DOCUMENTS

| | | | |
|---|---|---|---|
| 1,554,231 | 9/1925 | Press ........................................ | 343/788 |
| 3,569,969 | 3/1971 | Lemon, Jr. ............................... | 343/225 |
| 3,591,710 | 7/1971 | Katsuhito ................................. | 178/5.8 |
| 3,660,760 | 5/1972 | Schaad et al. ........................... | 325/287 |
| 3,750,180 | 7/1973 | Fujimoto et al. ........................ | 343/788 |
| 3,766,476 | 10/1973 | Connell ............................... | 179/15 BT |
| 3,809,825 | 5/1974 | Schaad et al. ............................ | 179/82 |
| 4,250,507 | 2/1981 | Wingard ................................... | 343/742 |
| 4,747,158 | 5/1988 | Goldberg et al. ......................... | 455/11 |
| 4,751,515 | 6/1988 | Corum ..................................... | 343/742 |
| 4,908,869 | 3/1990 | Lenderman ............................... | 381/79 |
| 4,922,261 | 5/1990 | O'Farrell ................................. | 343/742 |
| 4,941,201 | 7/1990 | Davis ...................................... | 455/11 |
| 5,027,709 | 7/1991 | Slagle ..................................... | 102/427 |
| 5,032,947 | 7/1991 | Li et al. .................................. | 361/143 |
| 5,258,766 | 11/1993 | Murdoch .................................. | 343/742 |
| 5,321,412 | 6/1994 | Kopp et al. .............................. | 343/742 |
| 5,420,579 | 5/1995 | Urbas et al. ........................ | 340/870.31 |
| 5,426,409 | 6/1995 | Johnson ................................... | 336/178 |
| 5,437,057 | 7/1995 | Richley et al. ........................... | 343/867 |
| 5,568,005 | 10/1996 | Davidson ................................. | 310/328 |
| 5,568,616 | 10/1996 | Strohallen et al. ...................... | 375/259 |
| 5,612,652 | 3/1997 | Crosby ...................................... | 333/24 |
| 5,694,139 | 12/1997 | Saito et al. ............................... | 343/866 |
| 5,734,353 | 3/1998 | Van Voorhies .......................... | 343/742 |
| 5,771,438 | 6/1998 | Palermo et al. .......................... | 455/41 |

FOREIGN PATENT DOCUMENTS

| | | | |
|---|---|---|---|
| 27 08 464 | 9/1977 | Germany .......................... | H04B 1/18 |
| 225901 | 6/1943 | Switzerland . | |
| 1164281 | 9/1969 | United Kingdom ............. | H04B 5/00 |
| 2 123 214 | 1/1984 | United Kingdom . | |
| 2 197 160 | 5/1988 | United Kingdom ............. | H04B 5/02 |
| WO92/00635 | 1/1992 | WIPO . | |
| WO 96/37052 | 11/1996 | WIPO .............................. | H04B 5/02 |

*Primary Examiner*—Hoanganh Le
*Assistant Examiner*—Tho Phan
*Attorney, Agent, or Firm*—Fenwick & West LLP

[57] ABSTRACT

Communication systems requiring a user to wear a headset or body pack preferably include small aerials that use ferrite cores to achieve transmission efficiency. Driving such aerials typically requires the use of a transformer to obtain the strongest possible magnetic field where only a limited supply voltage is available. The limited supply voltage is addressed by combining a step-up transformer and an aerial array on a single permeable core. The transformer includes a primary winding and a secondary winding that are wound along the circumference of the circular cross-section of a toroidal core. The aerial array includes a transmit winding and a receive winding. The transmit winding is wound along the diameter of the toroidal core and the receive winding is wound along the circumference of the toroidal core. In one embodiment, the receive winding is divided into two matching halves. The voltages induced in each half of the receive winding are amplified and summed such that voltages induced by the local transmit winding are canceled while those voltages induced from a transmit winding in a second, distant unit are summed. In another embodiment, a plurality of transmit windings are wound on the core for producing fluxes which are summed in the core and generate a single magnetic induction field.

12 Claims, 2 Drawing Sheets

AERIAL ARRAYS FOR MAGNETIC INDUCTION COMMUNICATION SYSTEMS HAVING LIMITED POWER SUPPLIES

CROSS-REFERENCE TO RELATED APPLICATIONS

This application is a continuation-in-part of application U.S. application Ser. No. 08/742,337, filed on Nov. 1, 1996, entitled "Aerial Arrays For Inductive Communication Systems," U.S. Pat. No. 5,966,641, which is incorporated by reference herein in its entirety.

FIELD OF THE INVENTION

This invention relates to Magnetic Induction (MI) communication systems, and more particularly, to MI communication systems having limited power supplies.

BACKGROUND OF THE INVENTION

MI communication systems that require a user to wear a headset or body pack preferably include small aerials that use ferrite cores to achieve transmission efficiency. Driving such an aerial system typically requires the use of a transformer to obtain the strongest possible magnetic field where only a limited supply voltage is available. Conventionally, the transformer and the aerials (i.e., the two magnetic components) are separate items—the transformer is wound on a toroidal core and the aerials are wound on a cylindrical rod or solenoid.

It is typical for MI communication systems with duplex links to operate two channels—one channel for transmitting and one channel for receiving. The signal frequencies for each channel are usually only a fraction of an octave apart. Therefore, it is advantageous to use an aerial system having two separate aerials, one for transmitting and one for receiving. These aerials preferably are arranged to have near zero mutual inductance, thus avoiding the use of complex filters which can be bulky at the frequencies used for MI. To achieve near zero mutual inductance, the transmit and receive aerials are arranged to be mutually orthogonal and have coincident geometric centers.

Furthermore, portable MI communication systems usually have unequal rectangular cross-sections, as the direct effect of providing a housing around a printed circuit board. These systems preferably use a mix of cylindrical or solenoid aerials and air-cored loop aerials to accommodate these packaging limitations.

Accordingly, there is a need for small and efficient MI aerial systems in portable units having limited supply voltages. It is desired that these MI aerial systems transmit the strongest possible magnetic induction field while having a high transmission efficiency. It is further desired that these MI aerial systems include separate transmit and receive aerials having zero mutual inductance to avoid using complex filters which can be bulky at the frequencies used for MI.

SUMMARY OF THE INVENTION

The present invention combines a step-up transformer and an aerial array on a single permeable core. The step-up transformer preferably includes a primary winding and a secondary winding wound on a core. Applying a supply voltage to a terminal of the primary winding sets up a current in the primary winding which generates a flux path through the core. The flux path induces a voltage at a terminal of the secondary winding that is higher, i.e., stepped-up, from the supply voltage at the terminal of the primary winding.

The aerial array preferably includes a transmit winding and a receive winding wound on the core. Thus, the primary and secondary windings of the step-up transformer and the receive and the transmit windings of the aerial array share the same core.

In another embodiment, the problem of having a limited supply voltage is addressed by providing separate drives to a plurality of transmit windings. The transmit windings may be physically separated to operate as independent transmitters, or simultaneously wound as a multi-filar winding—two windings being bi-filar wound, three windings being tri-filar wound, and so on. The fluxes produced by the transmit windings are summed by a core, i.e., magnetic circuit, and generate a single magnetic field.

In another embodiment, a receive winding is divided into two matching halves. The voltages induced in each half of the receive winding are amplified and summed such that voltages induced by a local transmit winding are canceled while those voltages induced from a transmit winding in a second, distant unit are summed.

These and other features, aspects, and advantages of the present invention will become better understood with regard to the following description, appended claims, and accompanying drawings.

DESCRIPTION OF THE PREFERRED EMBODIMENTS

Figure 1:
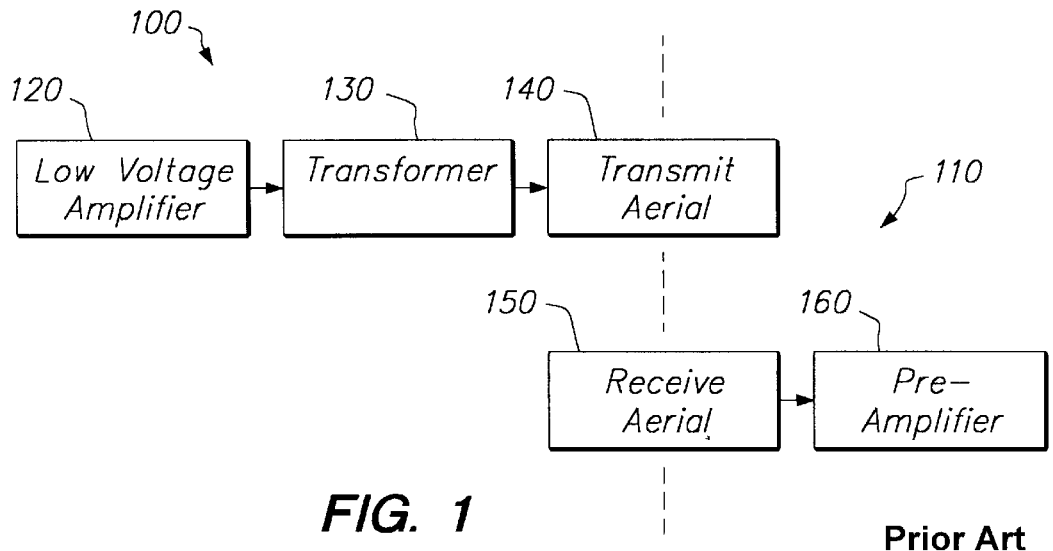
FIG. 1 is a block diagram of a MI communication system that uses orthogonal magnetic induction fields as a communication link.

Referring to FIG. 1, there is shown a block diagram of a MI communication system that uses orthogonal magnetic induction fields as a communication link. The MI communication system includes an inductive transmitter 100 and an inductive receiver 110, typically co-located in the same package. The inductive transmitter 100 includes a low voltage amplifier 120, a transformer 130, and a transmit aerial 140. The inductive receiver 110 includes a receive aerial 150 and a pre-amplifier 160.

In the inductive transmitter 100, the low voltage amplifier 110 is coupled to the transformer 130. The transformer 130 is typically a step-up transformer. The transformer 130 is used to increase the drive to the transmit aerial 140. The transmit aerial 140 is typically a small MI aerial having a ferrite core to achieve transmission efficiency. Driving the transmit aerial 140 requires the use of the transformer 130 to obtain the strongest possible magnetic field where only a limited supply voltage is available. This magnetic field provides a carrier that can be modulated by an information signal from, for example, a telephone headset.

An information signal modulated on a MI carrier and transmitted by a distant unit is received via a receive aerial 150 forming part of the inductive receiver 110. The receive aerial 150 may also have a ferrite core to achieve efficient reception of the information signal. After the signal is received by the receive aerial 150 it is further processed by the pre-amplifier 160. The pre-amplifier 160 is a conventional inductive preamplifier.

In conventional systems, the two magnetic components in the transmit path of the MI communication system, namely, the transformer 130 and the transmit aerial 140, are separate elements. The transformer 130 typically is wound on a toroidal core and the aerial is wound on cylindrical rod or solenoid. Because it is desirable for MI duplex links to operate two channels that are a fraction of an octave apart, it is advantageous to arrange the transmit aerial 140 and the receive aerial 150 to have near zero mutual inductance so as to avoid the need for conventional duplex filters which add complexity, and can be bulky at the frequencies used for MI. To achieve near zero mutual inductance the transmit aerial 140 and the receive aerial 150 are arranged to be mutually orthogonal and have coincident geometric centers. A practical implementation is also influenced by the package geometry.

Figure 2:
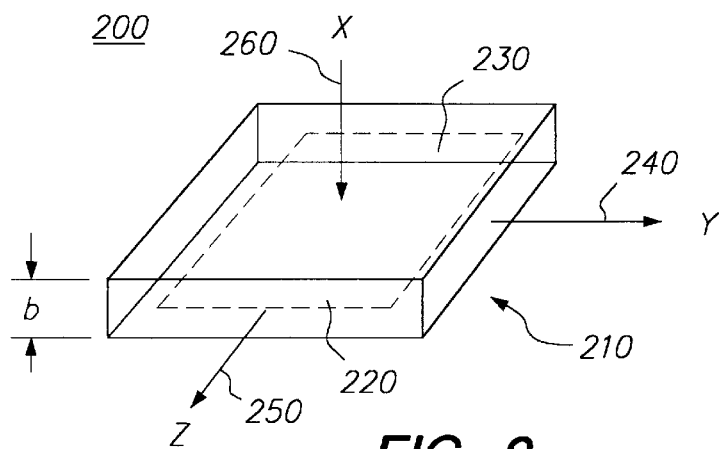
FIG. 2 is a perspective view illustrating a conventional package geometry.

Referring to FIG. 2, a typical package geometry is shown. A portable unit 200 usually has unequal rectangular cross sections, as the direct effect of providing a housing 210 around a printed circuit board 220. The printed circuit board 220 has transmit aerials (not shown) disposed on a major surface 230. These aerials transmit in the plane of the board along a first transmit axis 240 (hereinafter also referred to as "Y-axis") and a second transmit axis 250 (hereinafter also referred to as "Z-axis"). The printed circuit board 220 also has a receive aerial (not shown) disposed on the major surface 230. This aerial receives in a plane orthogonal to the major surface 230 along a receive axis 260 (hereinafter also referred to as "X-axis").

The housing 210 is worn by a user, for example, as a body pack. To function as a body pack, the dimension of the housing 210 along the receive axis 260 must be as short as possible so the pack lays flat against the user's body. Cylindrical or solenoid aerials fit conveniently along the first transmit axis 240 and the second transmit axis 250, but not along the receive axis 260. Rather, an aerial loop with a short dimension "b" along the receive 260 is used. This aerial loop is typically an air-cored coil. The air-cored coil may be formed of conductive wire, self-adhesive foil, or tracks on a printed circuit board. The shape of the aerial may be altered to conform with the physical shape of the package. The loop may be formed at the time of installation.

In the frequency band of about 1 to about 10 MHz, an air-cored loop aerial will have lower transmission losses than an aerial using a permeable core. Furthermore, it is typically desirable to tune the receive aerial, but not the transmit aerial. The higher "Q" of the air-cored loop aerial lends itself to this function. Therefore, the receive axis 260 is preferred for the receive function and the first transmit axis 240 and the second transmit axis 250 are used for the transmit function as illustrated in FIG. 2.

Figure 3A:
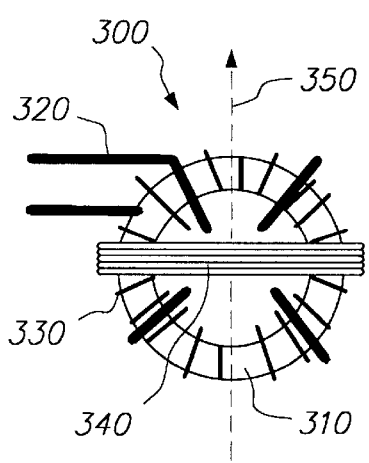
FIG. 3A is a top plan view of one embodiment of an MI aerial system in accordance with the present invention.

Referring to FIG. 3A, there is shown a top plan view (i.e., looking down along the X-axis in FIG. 2) of one embodiment of an MI aerial system 300 in accordance with the present invention. While the embodiments described below refer to a permeable toroidal core, other types of cores are equally applicable to the present invention (e.g., rectangular, cylindrical).

The MI aerial system 300 includes a toroidal core 310, a primary winding 320, a secondary winding 330, and a transmit winding 340. The primary winding 320 is wound on the toroidal core 310 having a circular cross-section. More particularly, each turn of the primary winding 320 follows the circumference of the circular cross-section of the toroidal core 310. The secondary winding 330 is wound in a similar manner on the same toroidal core 310, thus forming a step-up transformer. The number of turns of the primary and secondary windings are chosen to generate desired voltages using conventional techniques. The primary winding 320 and the secondary winding 330, for example, are made of conductive wire. The toroidal core 310, for example, is a ferrite.

Applying a supply voltage to a terminal of the primary winding sets up a current in the primary winding which generates a flux path through the toroidal core. The flux path induces a voltage at a terminal of the secondary winding that is higher, i.e., stepped-up, from the supply voltage at the terminal of the primary winding. The flux path produced in the toroidal core 310 has a direction determined by the direction of the current flowing through the primary winding. The terminals of the primary winding 320 are connected to a local voltage supply, and the terminals of the secondary windings are connected to an energy sink, or a negative terminal of the voltage supply to complete an electrical circuit path.

The transmit winding 340 is wound along the diameter of the toroidal core 310. The transmit winding 340 transmits flux along a transmit axis 350 (the Y-axis or the Z-axis in FIG. 2) when driven by the step-up transformer 130. The number of turns in the transmit winding 340 is chosen to generate desired voltages using conventional techniques. The transmit winding 340, for example, is made of conductive wire.

The MI aerial system 300 just described operates with limited voltage by winding the transmit winding 340 on the same toroidal core 310 that forms the step-up transformer for driving the transmit winding 340.

Figure 3B:
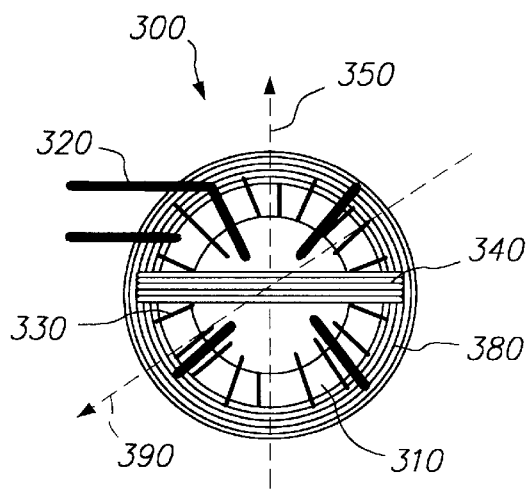
FIG. 3B is a top plan view of the MI aerial system in FIG. 3A including a receive aerial in accordance with the present invention.

Referring to FIG. 3B, there is shown a top plan view (i.e., looking down along the X-axis in FIG. 2) of the MI aerial system 300 in FIG. 3A including a receive winding 380. The receive winding 380 is wound along the circumference of the toroidal core 310 as illustrated in FIG. 3B. The number of turns in the receive winding 380 is chosen to generate desired voltages using conventional techniques. The receive winding 380, for example, is made of conductive wire.

The receive winding 380 receives a magnetic induction field along a receive axis 390 (the X-axis in FIG. 2). The receive axis 390 of the receive winding 380 is mutually orthogonal with the transmit axis 350 of the transmit winding 340. The transmit axis 350 and the receive axis 390 also have coincident geometric centers. The orthogonal arrangement of the transmit axis 350 and the receive axis 390 results in near zero mutual inductance and avoids the need for conventional duplex filters which add complexity, and can be bulky at the frequencies used for MI. In FIG. 3B, the receive axis 390 is directed out of the plane of the page.

The effective permeability of the toroidal core 310 is low along its minor axis, thus allowing the area of the receive winding 380 to be reduced compared to an equivalent air-cored loop aerial without overly compromising the "Q" of the aerial. The toroidal core 310 also provides the mechanical support needed to maintain an accurate null coupling to the transmit winding 340. In addition, the presence of the permeable material reduces the sensitivity of transmit winding 340 and the receive winding 380 to the introduction of foreign metals (e.g., key and coins), into the magnetic environment.

Figure 4A:
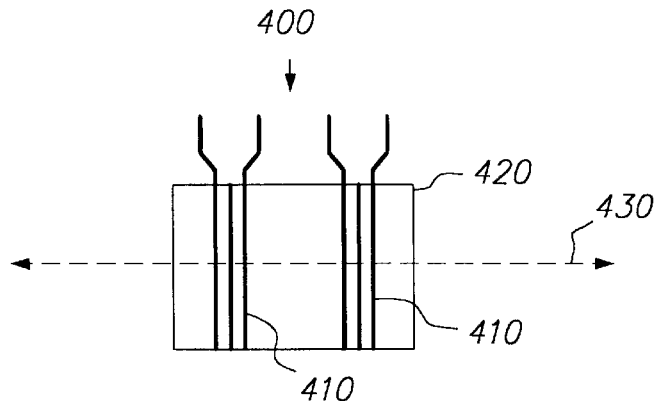
FIG. 4A is a top plan view of one embodiment of an MI aerial system including a dual drive in accordance with the present invention.

Referring to FIG. 4A, there is shown a top plan view of one embodiment of an MI aerial system 400. The MI aerial system includes at least two transmit windings 410 and a permeable core 420. The transmit windings 410 are wound on the permeable core 420. Each transmit winding 410 is coupled to a separate drive amplifier (not shown). The transmit windings 410 are physically separated on the permeable core 420 to operate as independent transmitters as seen by the drive amplifiers. The number of turns in the transmit windings 410 is chosen to generate desired voltages using conventional techniques. Alternatively, the transmit windings 410 are simultaneously wound on the permeable core 420 as a multi-filar winding—two windings being bi-filar, three windings being tri-filar, and so on.

The fluxes produced by the transmit windings 410 are summed in the permeable core 420. The summed fluxes generate a single transmit field along a transmit axis 430. The summation is not perfect since the proximity of other transmit windings 410 causes a slight cancellation of the magnetic induction fields generated by the transmit windings 410. The transmit windings 410 can produce from about two to about eight times the field strength of a single transmit winding.

Figure 4B:
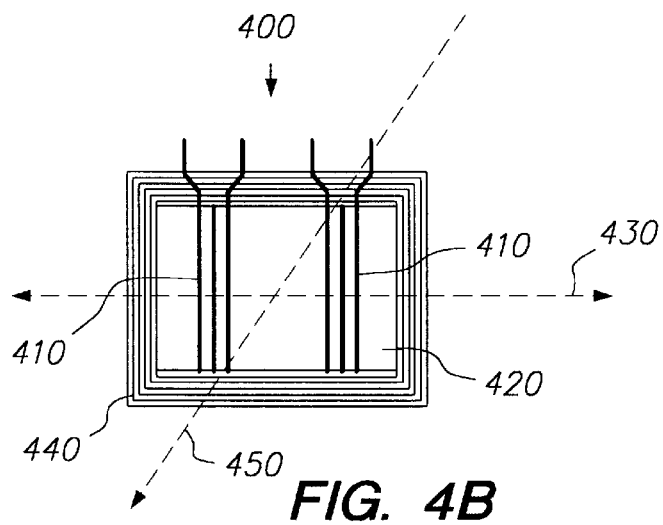
FIG. 4B is a top plan view of the MI aerial system in FIG. 4A including a receive aerial in accordance with the present invention.

Referring to FIG. 4B, there is shown a top plan view of the MI aerial system in FIG. 4A including a receive winding 440 in accordance with the present invention. The receive winding 440 is wound along the perimeter of the permeable core 420 as illustrated in FIG. 4B. The number of turns in the receive winding 440 is chosen to generate desired voltages using conventional techniques. The receive winding 440 receives a magnetic induction field along a receive axis 450 (the X-axis in FIG. 2). The receive axis 450 of the receive winding 440 and the transmit axis 430 of the transmit windings 410 are mutually orthogonal. The transmit axis 430 and the receive axis 450 also have coincident geometric centers. The mutually orthogonal arrangement of the transmit axis 430 and the receive axis 450 results in near zero mutual inductance and avoids the need for conventional duplex filters which add complexity, and can be bulky at the frequencies used for MI. In FIG. 4B, the receive axis 450 is directed out of the plane of the page.

With respect to the embodiments in FIGS. 4A and 4B, a third transmit winding (not shown), mutually orthogonal to the other transmit windings 410, can be wound on the permeable core 420 to provide a second transmit axis to create, for example, a rotating field.

Figure 5:
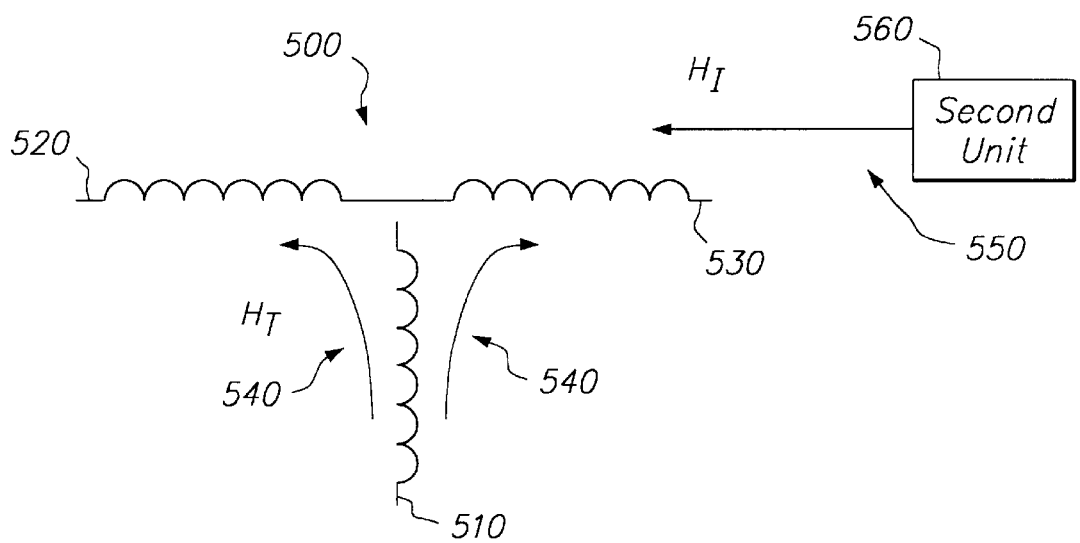
FIG. 5 illustrates one embodiment of a receive aerial in accordance with the present invention.

Referring to FIG. 5, there is illustrated one embodiment of a receive winding 500 in accordance with the present invention. The receive winding 500 is subdivided into matched portions 520 and 530. A transmit flux 540 produced by a local transmit winding 510 induces in the portions 520 and 530, respectively, first voltages having opposite polarity. The first voltages induced by the local transmit winding 510 are electronically amplified and summed so that they cancel each other.

A second transmitted flux 550 generated from a second, distant unit 560 induces second voltages in the portions 520 and 530, respectively, having the same polarity. Like the first voltages, the second voltages are amplified and summed electronically, but with little or no cancellation. The first voltages and the second voltages are amplified and summed using conventional techniques (e.g., amplifiers, summers).

The above-described embodiments of the present invention enable MI communication systems to transmit the strongest possible magnetic induction field while having a high transmission efficiency. The embodiments achieve this by implementing all the magnetic functions of the MI communication system (FIG. 1) with a single permeable core while minimizing the cost and the weight of such implementation.

Moreover, the orthogonal arrangement of the transmit axis of the transmit winding and the receive axis of the receive winding are arranged to have near zero mutual inductance and, thereby avoid the need for conventional duplex filters which add complexity, and can be bulky at the frequencies used for MI. Furthermore, the use of a subdivided receive winding reduces interference (e.g., cross-talk) between proximate windings.

What is claimed is:

1. An aerial array for providing a magnetic induction communication link, comprising:
    a transformer, having a primary winding and a secondary winding, wound on a core;
    a transmit winding, having a transmit axis, wound on the core for transmitting a first magnetic induction field directed along the transmit axis; and
    a receive winding, having a receive axis substantially orthogonal to the transmit axis, and further having a substantially coincident geometric center with the transmit axis, the receive winding wound on the core for receiving a second magnetic induction field directed along the receive axis.

2. The aerial array of claim 1, wherein the receive winding is divided into at least two portions to facilitate electronic canceling of a first signal and a second signal induced in each portion, respectively, by a third signal in the transmit winding when transmitting the first magnetic induction field.

3. The aerial array of claim 2, wherein the portions of the receive winding are of substantially equal length.

4. The aerial array of claim 2, wherein a fourth signal from a distant source is summed in the core without substantial cancellation.

5. The aerial array of claim 1, wherein the transformer is configured as a step-up transformer.

6. The aerial array of claim 1, wherein the aerial array is mounted in a housing and worn by a user as a body pack.

7. The aerial array claim 1, wherein the core is a permeable toroidal core.

8. An aerial array for providing a magnetic induction communication link, comprising:
    a core;
    a plurality of transmit windings wound on the core for transmitting a first magnetic induction field directed along a first transmit axis; and
    a receive winding, having a receive axis substantially orthogonal to the first transmit axis, and further having a substantially coincident geometric center with the first transmit axis, the receive winding wound on the core for receiving a second magnetic induction field directed along the receive axis.

9. The aerial array of claim 8, wherein the transmit windings are simultaneously wound on the core as a multi-filar winding.

10. The aerial array of claim 8, wherein each transmit winding is coupled to the core and is physically separated from the other transmit windings to operate independently, each transmit winding producing respective magnetic fluxes that are summed by the core and generate the first magnetic induction field.

11. The aerial array of claim 8, wherein at least one transmit winding has a second transmit axis that is mutually orthogonal to the first transmit axis and generates a rotating field along the second transmit axis.

12. The aerial array of claim 8, wherein the core is a permeable toroidal core.

* * * * *